United States Patent [19]

Frei

[11] 4,191,415
[45] Mar. 4, 1980

[54] STORAGE AND TRANSPORTATION APPARATUS

[76] Inventor: Heinz Frei, Ziegelrain 29, CH-5001 Aarau, Switzerland

[21] Appl. No.: 933,884

[22] Filed: Aug. 15, 1978

[30] Foreign Application Priority Data

Aug. 25, 1977 [DE] Fed. Rep. of Germany ....... 2738332

[51] Int. Cl.² .............................................. B66C 1/16
[52] U.S. Cl. ................................. 294/67 R; 206/443; 414/608
[58] Field of Search ............ 294/67 R, 67 D, 67 DA, 294/67 E, 81 R, 81 SF, 87 R; 206/443; 211/49 R, 60 R, 60 S; 414/97, 608

[56] References Cited

U.S. PATENT DOCUMENTS

| 3,028,186 | 4/1962 | Skubic | 294/67 D |
|---|---|---|---|
| 3,173,556 | 3/1965 | Gaudriot et al. | 294/67 D X |
| 3,537,599 | 11/1970 | Jay | 211/60 R X |
| 3,574,382 | 4/1971 | Strauss | 294/67 R |
| 3,581,907 | 6/1971 | Schmidt | 211/60 R X |
| 4,045,071 | 8/1977 | Dunstan | 294/67 R |

*Primary Examiner*—Johnny D. Cherry
*Attorney, Agent, or Firm*—Abraham A. Saffitz

[57] ABSTRACT

The invention relates to apparatus for storing and transporting heavy elongated workpieces such as round steel, sectional steel, steel pipes and the like. The apparatus comprises at least two stock racks each of which is formed from two substantially U-shaped girders connected together. A carrying device is also provided for use with a crane in lifting and moving the racks.

2 Claims, 8 Drawing Figures

STORAGE AND TRANSPORTATION APPARATUS

BACKGROUND OF THE INVENTION (1) Field of the Invention

The present invention relates to apparatus for storing and transporting heavy elongated workpieces, such as round steel, sectional steel, steel pipes and the like.

(2) The Prior Art

Apparatus for storing and transporting long pipes and rods is known which comprises at least two racks to support front and rear ends respectively to the pipe or rod which racks are each formed with an open rectangular shaped base and projecting from said base, and the corners thereof, two substantially U-shaped support members or girders which are connected to the rectangular base at the short sides thereof whereby the U-shaped support members serve as the girders for hoisting, transporting or storing said pipes or rods which lie between said U-shaped support members on the base. A traverse support, to be used together with a crane, is also provided as part of the apparatus, the traverse support having at least two pairs of support arms.

This known apparatus presents two problems. Firstly, it is desirable, in the interests of good utilization of the storage space available, to have as many assemblies (each assembly comprising at least two stock racks and associated stored work pieces) as possible stacked closely side-by-side and one above the other. Secondly, it is essential to enable the removal from the store of any selected assembly without necessitating too many re-groupings, and with a minimum expenditure of time and utilization of operating personnel. Similarly it is desirable when the workpieces are being transported, e.g. on a lorry or railway wagon, to make optimum use of the loading space available for the assemblies of apparatus and associated work pieces.

Known apparatus fails to fulfill these requirements to a desirable extent, since on the one hand a storage in which the individual assemblies (stock racks and work-pieces) lie closely side by side or even in contiguous manner, is precluded, because they could not then be moved individually with the aid of the traverse support with a crane. Tongs have been used as carrying devices suspended from a crane but these require the assistance by a helper to couple the stock racks to the lifter. However, it would be desirable to dispense with the assistant, and moreover such tongs are expensive and susceptible to trouble. It is important to have minimum operating expenditure and rapid, reliable storage turnover. The use of individual carrying ropes also is ruled out although this solution is considerably cheaper and more reliable than the gripping tongs. Finally, it must also be mentioned that such tong mechanism is relatively heavy and thus unnecessarily restricts the effective useful load of the crane.

OBJECT OF THE INVENTION

It is an object of the present invention to avoid the aforesaid disadvantages and to provide apparatus which is simple, cheap and robust in construction, has a minimum space requirement and upon the store turnover, apart from the crane driver, needs no assistants.

SUMMARY OF THE INVENTION

According to the present invention there is provided apparatus for storing and transporting heavy, elongated workpieces such as round steel, sectional steel, steel pipes and the like, the apparatus comprising at least two stock racks or cradles each of which is formed from two substantially U-shaped girders which are connected together, and a traverse support, to be used together with a crane, and having at least two pairs of supporting arms, characterised in that each of the stock racks or cradles is provided with two suspension plates each of which is mounted between the two free ends of the girders and has a portion protruding upwardly beyond the girders which is bent inwardly and provided with a hook, and in that each of the supporting arms is fastened by a reinforcing plate to the traverse support, which plate has a bevelled guide edge which lies in the region of the free ends of the arms.

In the interests of simple insertability of the supporting arms of the traverse support into the recesses of the suspension plates, the recesses may have substantially the shape of the axial section of a curved horn section, thereby providing an enforced guidance of the supporting arms as far as the bearing location of the same in the recess. So that no parts protrude beyond the bearing block, but no storage capacity is wasted, it is advantageous if the bent suspension plates lie between the outer and the inner bounding plane of the side parts of the U-girders.

For the reception of long, thin and flexible storage goods having little inherent stability, but more especially also for the reception of short and long storage goods of the same category, it can be advantageous to connect two of the stock racks together by longitudinal girders, in which respect the cassette formed in this way is provided with a base and two side walls made of wire grating.

BRIEF DESCRIPTION OF THE DRAWINGS

The present invention will hereinafter be further described by way of example with reference to the accompanying drawings in which.

DESCRIPTION OF THE PREFERRED EMBODIMENT

Figure 4:
FIG. 4 is a schematic side view of two stock racks loaded with elongated material.
Figure 5:
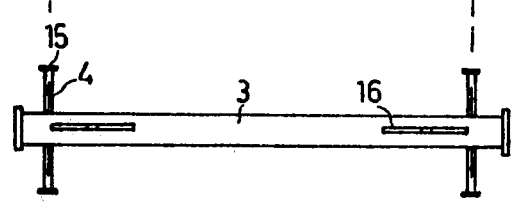
FIG. 5 is a plan view of a transportation traverse support of apparatus in accordance with the present invention.
Figure 6:
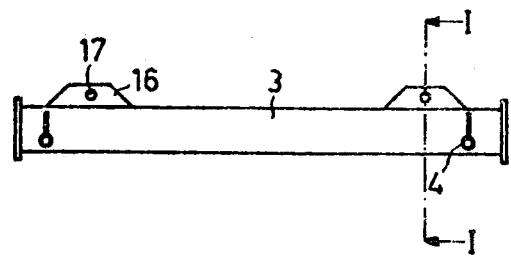
FIG. 6 is a side view of the traverse support of FIG. 5.

The apparatus for the storing and transporting of heavy, elongated workpieces comprises at least two stock racks 1, which as shown in FIG. 4, are arranged at a spacing from one another to receive the workpieces 2 to be stored or to be transported, the stock racks performing the function of a cradle for the rods or pipes. The apparatus also comprises a rack supporting member in the form of a traverse support 3 having at least two pairs of supporting arms 4 (FIGS. 5 and 6).

Figure 1:
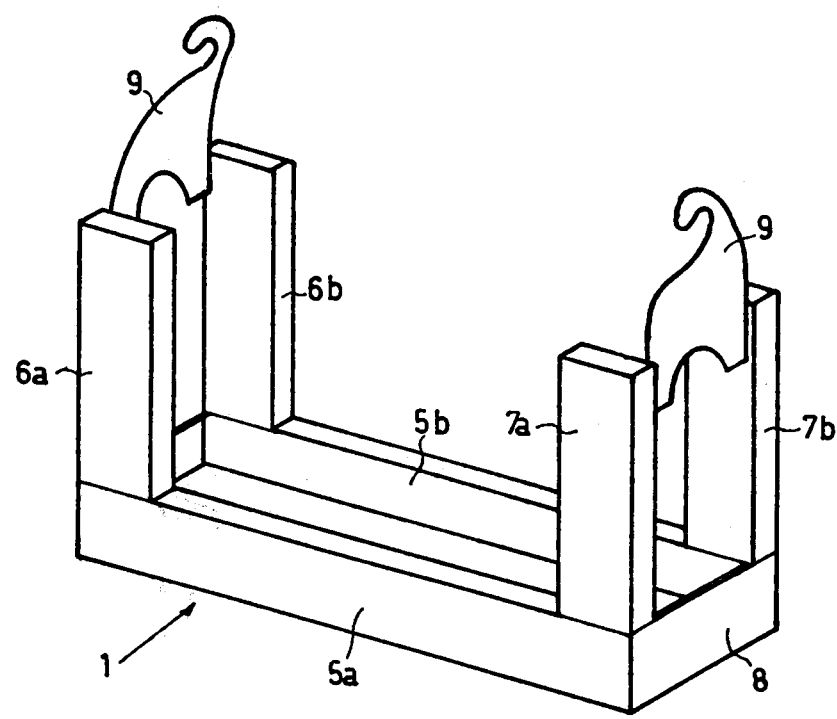
FIG. 1 is a perspective view of a stock rack in accordance with the present invention.
Figure 2:
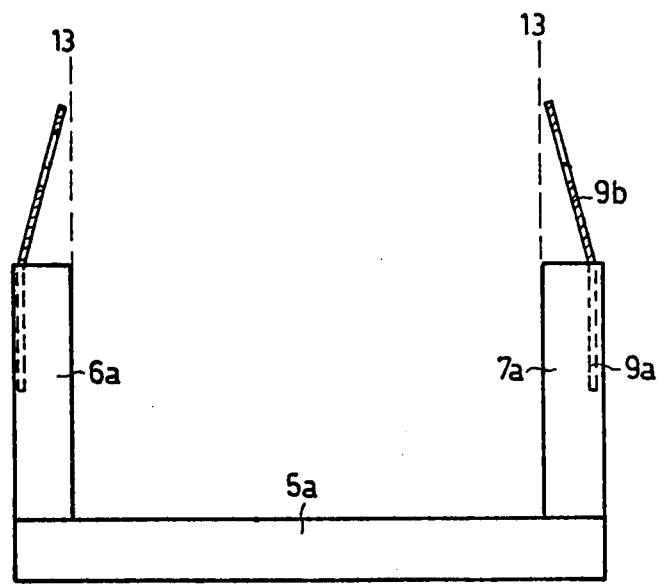
FIG. 2 is a partially sectioned front view of the stock rack of FIG. 1.
Figure 3:
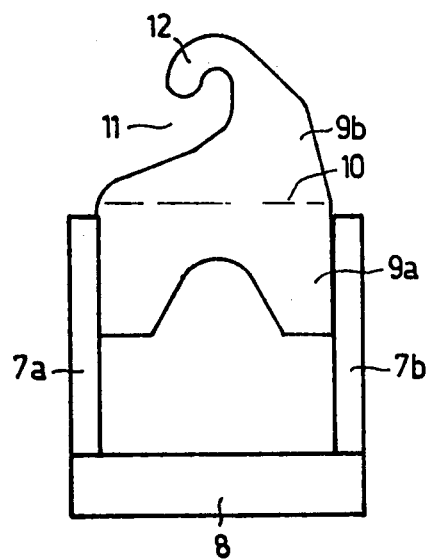
FIG. 3 is a side view of the stock rack.

Referring to FIGS. 1 to 3, each of the stock racks comprises two U-shaped girders each joined to base members 5a and 5b and the U-shaped girders consisting of two pairs of side members 6a and 6b and 7a and 7b respectively. The side members 6a, 6b and 7a, 7b are situated at the two ends of the base members 5a and 5b so as to be standing perpendicularly upwards, and are connected securely thereto. The base and side members can for example consist of steel sections with a tetragonal cross-section, I-cross-section or U-cross-section and may advantageously be welded together.

Provided for the connection of two such U-girders are, on the one hand, lower connection plates 8, which are advantageously each welded to the end faces of the base members 5a or 5b respectively, and on the other hand, suspension plates 9, which are arranged in the region of the upper free ends of the side-members 7a and 7b or 6a and 6b respectively. As may be seen from FIGS. 2 and 3, the suspension plates consist of two portions, a lower portion 9a and an upper portion 9b. The two portions 9a and 9b do not lie in the same plane, but are bent along the line 10, so that they together form an angle of about 165°. The lower part 9a is welded parallel to the lateral boundary plane of the stock rack 1, i.e. to the side members 6a and 6b or 7a and 7b. The width of the portion 9a corresponds in this respect to the clear width between the side members 7a and 7b (FIG. 3), and the attachment point is so selected that the plates 9 in no way protrude laterally beyond the stock rack. As is evident from FIG. 2 the plates 9 are set back by a small amount relative to the outer edges of the side members 6a or 7a.

The upper portion 9b of the suspension plate 9 has a recess 11 for the formation of a hook-like extension 12. The shape of this recess 11 is, in this respect, funnel-shaped and curved, approximately like an axial section through a curved horn. This results in a large inlet aperture and an enforced guidance towards the hook-like extension 12. The dimensions of the upper portion 9b and the angle between the portions 9a and 9b are so selected that the upper portion 9b in no way protrudes beyond a plane placed against the inner surfaces of the side members 6a and 6b or 7a and 7b (line 13 in FIG. 2). As a result of this arrangement, it is possible to stack several stock racks 1, one above the other without shortening the inner cross-section of the racks intended to receive the goods 14. This is clearly seen in FIG. 7, where an upper group of five stock racks 1, which is loaded with pipes 14, is placed onto a lower group of five stock racks, likewise loaded with pipes 14. It is further evident from FIG. 7 that the individual stock racks 1 can be placed closely side-by-side, which is very desirable in the interests of optimum utilization of the available storage space. Nevertheless, any desired one of the five upper racks can be lifted out individually without difficulty as will be described in yet more detail later on. Finally, it can also be seen from FIG. 7, how the upper portions 9b of the lower stock racks, which are shown in broken lines, engage into the free space between the side parts of the upper stock racks and thus do not take up any space needed for the reception of the storage material 14.

Serving for the transportation of an assembly, formed from the long material 2 and the two stock racks 1, as shown in FIG. 4, is a transportation traverse support 3 (FIGS. 5 and 6). This has, in the region of its two ends, two supporting arms 4 each, with the two arms of a pair diametrically opposed and fastened approximately at right angles away from the traverse support 3.

Plates 15 superimposed onto the ends of the arms 4 serve as protection against sliding off. Mounted at the top of the traverse support 3 are suspension members 16 having a respective aperture 17, by means of which the traverse support 3 can be suspended from a crane (not shown).

Figure 8:
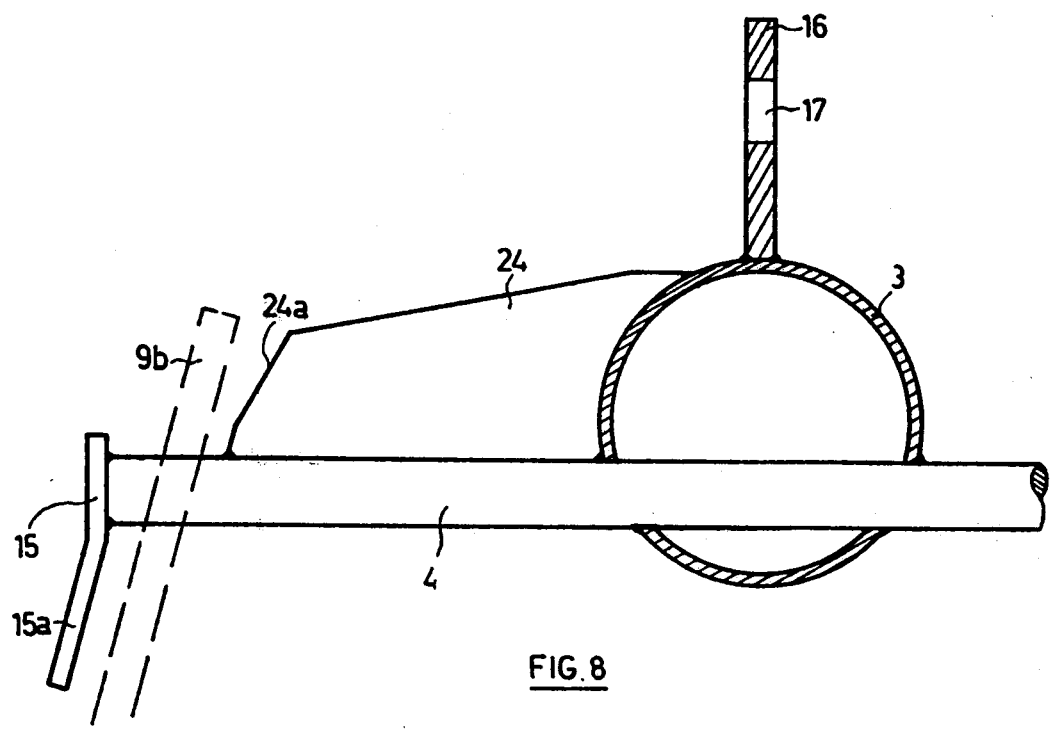
FIG. 8 is a section through the traverse support of FIG. 6 along the line I—I in FIG. 6.

From FIG. 8 it will be apparent that the supporting arms 4 are additionally fastened by means of plates 24 to the traverse support 3. These plates 24 serve for the reinforcement and also for the guidance of the upper, bent portion 9b of the suspension plates of the stock rack. Illustrated in FIG. 8, in broken lines, is the position of the portion 9b between the left-hand guide edge 24a and the plates 15 during the coupling of a stock rack. This is also assisted by the extension 15a of the plate 15. Thus it is ensured that the racks are suspended in exactly symmetrical manner from the supporting arms 4 of the traverse support 3, even if they are not coupled in an exactly centric manner.

Prior to the loading of the stock racks 1 with elongated material 2, it is necessary to ascertain that the stock racks 1 are set up at the correct spacing with regard to one another. Clearly the distance between the racks 1 (a in FIGS. 4 and 5) has to be equal to the distance between the supporting arms 4 of the traverse support. This is simply accomplished where the empty stock racks are put down by means of the traverse support 3. If this condition is fulfilled an assembly can be coupled in a simple manner, lifted up and transported away. The wide inlet aperture of the recess 11 in the upper portion 9b of the suspension plates 9 allows an effortless introduction of the supporting arms 4, which are necessarily brought, upon the raising of the traverse support 3, into the correct position underneath the hook-like extension 12. The lateral guidance and centering is, in this respect, ensured by the plates 24 and 15. It is thus a simple thing for a fairly experienced crane driver to grasp and transport a group of goods away without a further assistant having to be present at the assembly in order to make possible or to assist the engagement of the supporting arms 4 in the suspension plates 9.

Figure 7:
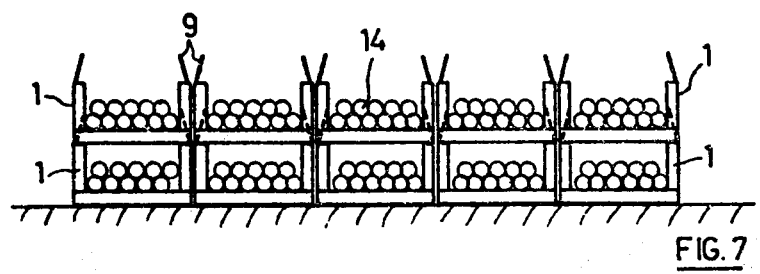
FIG. 7 shows a schematic front view of a group of sets of apparatus, in accordance with the present invention loaded with pipes.

By virtue of the inclination of the upper portions 9b of the suspension plates 9, it is ensured that, when several stock racks stand closely or continuously side-by-side, as for example in FIG. 7, the rack which is adjacent to the left or right is not also engaged. The supporting arms 4 of the traverse support 3 are, once they are anywhere in the region of the inlet aperture of the recess 11, perforce guided to the correct position. Moreover, the inclined arrangement of the upper portions 9b of the suspension plates 9 exerts a stabilizing effect, so that rope oscillations, as may occur with any crane, are rapidly damped.

The space-saving mode of construction of the stock rack 1 without salient parts and with optimum utilization of the available clear width between the side members 6a and 7a or 6b and 7b for the reception of the storage material becomes apparent also upon the transportation by a lorry or railway wagon, where, from experience, the loading space is restricted and should be utilized in the best possible manner.

If such assemblies are reloaded onto lorry, rail or ship, and the described traverse support is not available at the transloading point, then the hooks of a customarily used crane traverse support, or hook groups fastened to the crane hook, can be mounted on the suspension plates 9. In this case, of course, the suspension by hand by an additional operator is necessary.

It should also be mentioned that more than two stock racks may be used for the storage or transportation of very long goods. When using three racks per group of goods another transportation traverse support has to be provided which is constructed in substantially the same manner, but is provided with three pairs of supporting arms.

It is in this respect readily conceivable to use a universal traverse support having a large number of pairs of supporting arms so that all possible combinations with respect to number and spacing of the stock racks can be used.

In conclusion it should be mentioned that the apparatus of the invention provides a distinctly inexpensive and robust storage or transportation system. No moving parts are present which are susceptible to trouble or are exposed to wear, and with the aid of a number of individual stock racks and an universal traverse support the most varied elongated goods can be stored or transported. In practice it has been shown that this system is advantageously usable for elongated goods in a length range from 3 to 18 m and a weight range of up to 9 Mp.

What I claim is:

1. A loading, unloading and storage assembly for elongated pipes and rods which are cradled in at least two stock racks separated from each other to support said pipes and rods comprising:
   a plurality of stock racks, each having a rectangular base formed of long parallel girders on the long sides and plates on the short sides and a pair of upstanding end members of equal height at each short side of said rectangular base, which end members define a cradle along the long side for supporting said pipes and rods;
   a pair of flat suspension plates on each stock rack, each plate being in the form of a generally rectangular base portion which is welded to the upper inner portions of the upstanding end members and lies in a vertical plane of said upstanding end members and an inwardly tilted curvilinear hook portion bent along a line near the top of said upstanding end members to define an inwardly tilted angle of about 165 degrees measured along the inner surface of said suspension plate from said line, said hook portions opening in the same direction and said inwardly tilted angle of about 165 degrees permitting stacking of a plurality of said stock racks touching each other at their bases in end to end relationship while permitting lifting and transport from the hook portions and
   a traverse support including a longitudinal body with at least two pairs of short arms adjacent the ends thereof which are perpendicular to said body, each of said short arms being connected to said longitudinal body by a reinforcement and guiding plate comprising a bevelled guide edge near the free end of the arms, and the free end of the arms being equipped with securing plates having oblique guide extensions extending substantially parallel to said guide edge on the adjacent reinforcement and guiding plate.

2. An assembly as claimed in claim 1 wherein each hook portion is in the form of a curved horn with a recess for engaging a lifting device at each side of the rack.

* * * * *